March 20, 1945. W. J. WOODHAMS 2,372,164
VENTILATOR AND MECHANISM FOR OPERATING SAME
Filed July 17, 1942 2 Sheets-Sheet 1
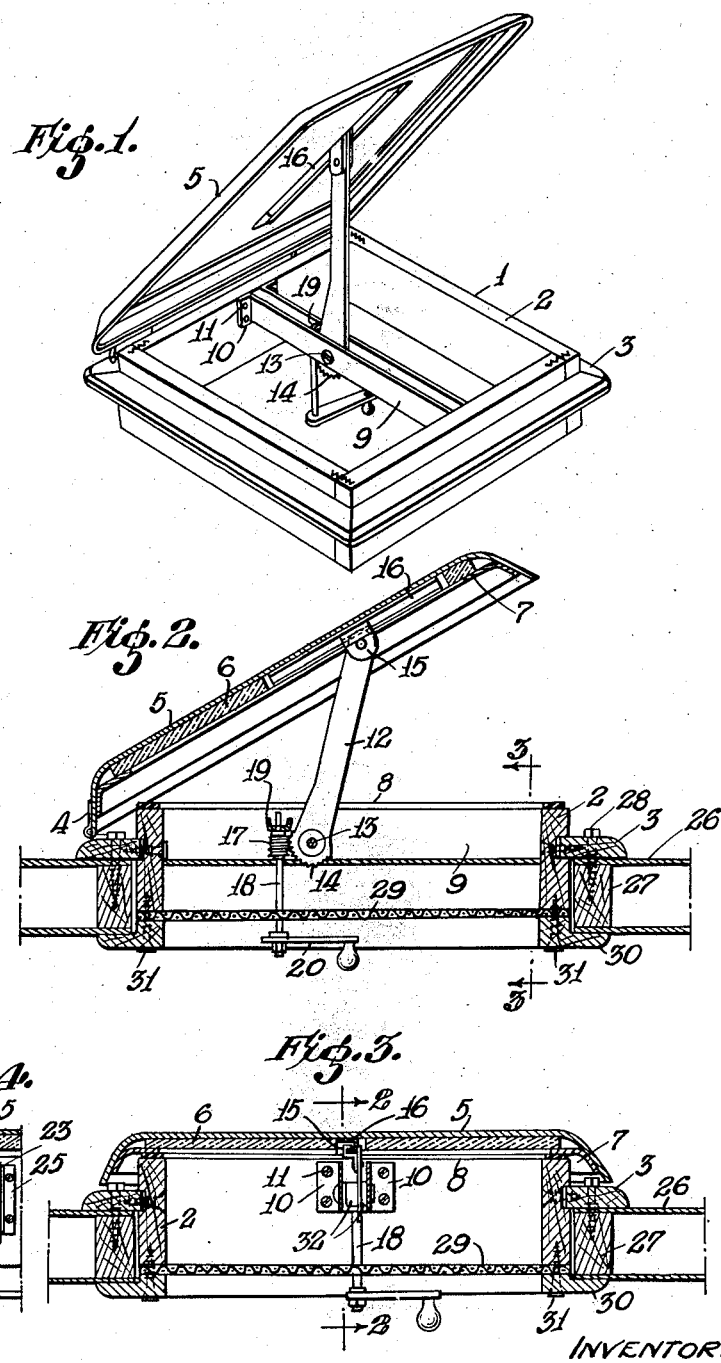
INVENTOR:
W. J. WOODHAMS,
BY Roy A. Plant
ATTORNEY

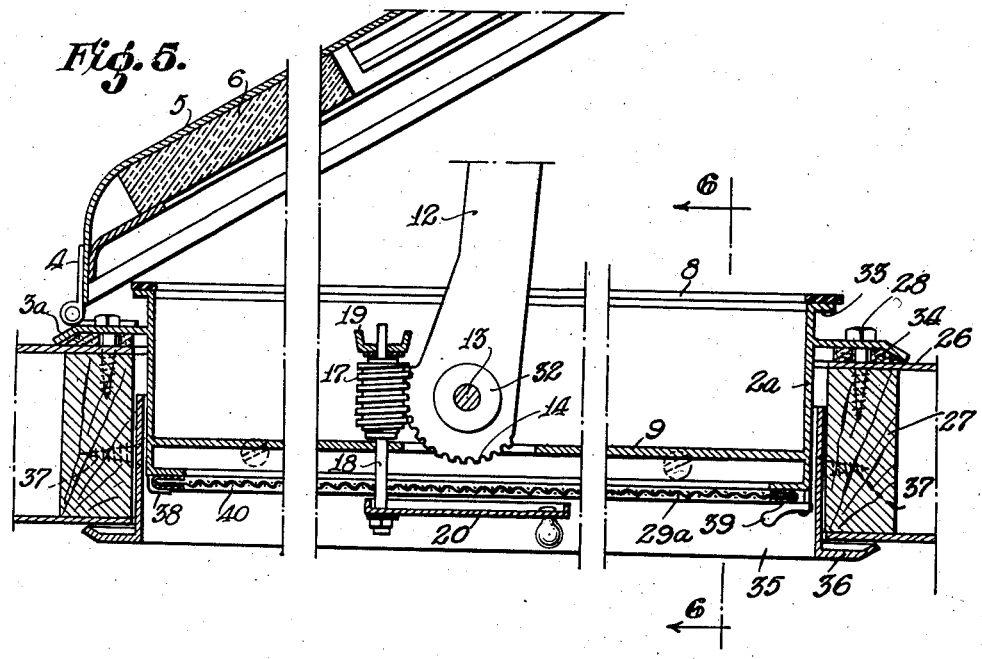

Patented Mar. 20, 1945

2,372,164

UNITED STATES PATENT OFFICE 2,372,164

VENTILATOR AND MECHANISM FOR OPERATING SAME

Walter J. Woodhams, Marshall, Mich., assignor to Woodlin Metal Products Company, Marshall, Mich., a firm owned and operated by Walter J. Woodhams and Alfred Laughlin as copartners Application July 17, 1942, Serial No. 451,250

7 Claims. (Cl. 98—2)

The present invention relates broadly to ventilators and ventilator operating mechanisms, and in its specific phases it relates more particularly to ventilators of the type suited for use in the roof of a house trailer or the like.

Ventilators of various types are in common use, and in general the type to which the present invention belongs might be classed as roof or skylight ventilators. The standard type of ventilator used in house trailer roof constructions involves a metal frame having telescoping members which facilitate fitting roofs of various thickness. The top closure panel is hinged at one edge to the outer telescoping member which fits the roof opening, and the mechanism for opening and closing this member is mounted on a short bracket connected only on the inner telescoping member at the hinge side of the assembly. This inner telescoping member is insertable into the other member from the bottom thereof when same is in place in the roof opening. Ventilators having this type of construction are a constant source of trouble, due, in a large measure, to the operating mechanism bracket tending to break loose under operating conditions, and particularly under conditions where the ventilator is open and the trailer is being hauled at even moderate speed in conventional manner. In spite of the complexities of assemblies involving telescoping members, the difficulty of sidewise anchoring the bottom inserted telescoping member, and the breakage difficulties, this type of construction has remained standard for many years. It was with a view to improving ventilator constructions, simplifying same, and avoiding the prior breakage difficulties that the present invention was devised.

Accordingly among the objects of the present invention is the provision of a roof ventilator of simplified and highly stable construction.

Another object is to provide a roof ventilator which utilizes a stabilized and securely supported operating mechanism which minimizes the previous breakage difficulties.

A still further object is to provide a roof ventilator wherein the top closure panel of same is operated through a suitable mechanism mounted on a supporting member extending across the assembly frame and anchored at both ends thereto.

A still further object is to provide a house trailer roof ventilator which has a wooden frame and a channel supported top closure panel operating assembly. the ends of the channel being fastened both at the hinge side of the frame and the side directly opposite thereto.

A still further object is to provide an operating mechanism supporting member which strengthens and stiffens the whole roof ventilator frame assembly.

A still further object is to provide a roof ventilator assembly utilizing an open ended thimble with outturned flange at the lower portion of the roof opening into which the ventilator is to be installed, and a metal construction roof ventilator frame member adapted to telescope into said thimble from the upper end thereof, said ventilator assembly having a removable screen mounted directly on the lower face of said frame member.

A still further object is to provide a roof ventilator wherein the operating handle of same is substantially at or above ceiling elevation.

Still further objects and advantages of the present invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

In said annexed drawings:

Figure 1 shows a perspective view of a roof ventilator assembly illustrating a preferred form of the present invention.

Figure 2 is a longitudinal sectional elevation of the assembly shown in Figure 1, together with further details, and as taken along line 2—2 of Figure 3, looking in the direction of the arrows.

Figure 3 is a transverse sectional elevation as taken along line 3—3 of Figure 2, looking in the direction of the arrows, and with the cover member in closed position.

Figure 4 is a fragmentary sectional elevation showing a modification of the central portion of the assembly illustrated in Figure 3.

Figure 5 is a longitudinal sectional elevation of a modified form of the present invention as taken along line 5—5 of Figure 6, looking in the direction of the arrows, but with the ventilator cover member in elevated position.

Fig. 6 is a transverse sectional elevation as taken along line 6—6 of Figure 5, looking in the direction of the arrows, but with the ventilator cover member in closed position.

In closed vehicles, such as house trailers, it is common practice to provide a pair of roof ventilators, one of which is adapted to open facing forward, and the other to open facing rearward of the trailer. These ventilators facilitate the delivery of fresh air and the removal of stale air from the trailer interior to overcome unpleasant stuffiness in hot weather, and in some cases cooking odors and fumes. An important characteristic of my present invention is the improvement of ventilators of this type to simplify same, and at the same time, to make them stronger and less subject to breakage.

Referring more particularly to Figures 1, 2, and 3 of the drawings, the ventilator assembly 1 is provided with a frame 2, which if desired, may be made of wood strips fastened together in conventional manner. This frame may be provided with an outer circumferential groove into which the inner edge of flange 3 is adapted to be fitted in manner forming a fluid-tight joint.

Mounted on flange 3 by means of hinges 4 is a top closure panel or cover member 5. This cover member may be made out of wood, metal, synthetic plastic material in relatively rigid form, or the like, but for convenience and ease of construction, same is preferably made of sheet steel. For insulation purposes, a panel of fibrous sheet insulating material 6, such as Celotex or Masonite, may be placed inside of cover member 5 and held there in conventional manner, for instance, by means of a sheet metal member or members 7 spot welded or otherwise fastened to cover member 5. Cover member 5 may be provided with a glass panel if desired, without departing from the spirit of the present invention, and the showing in Figure 1 is to be considered as diagrammatically illustrating both this construction and the plain construction shown in detail in Figures 2 and 3. In preferred construction, a gasket 8 of rubber, or other suitable gasket material, is provided on the upper end of frame 2 to provide a seal with cover member 5 when the latter is in closed position.

The raising and lowering of cover member 5 is preferably accomplished by means of a mechanism of the type diagrammatically illustrated in the drawings. In preferred construction this mechanism utilizes a channel 9 formed from heavy sheet metal with the upper face of the channel open and the ends of same flanged outward to form end members 10 adapted to be anchored to frame 2 by means of stove bolts or screws 11. Operating arm 12 mounted on a suitable pintle 13, which passes through channel 9 at a suitable point between its ends, has teeth 14 cut on its lower end in an arc, the center line of which coincides with the center line of pintle 13. The use of an open upper face channel 9 permits operating arm 12 to pass into the channel when cover member 5 is lowered into closed position. Spacers 32 may be used to position operating arm 12 on pintle 13 between the upturned flanges of channel 9, and these spacers may be either loosely mounted on the pintle, or anchored to the channel, arm, or pintle. Pivotally mounted on the upper end of operating arm 12 is a substantially hook-shaped member 15 adapted to engage the lower flange of a substantially U-shaped or J-shaped slide member 16 which is mounted on the inner face of cover member 5 and in position to facilitate endwise sliding of the hook-shaped member thereon. This hook-shaped member is preferably held in engagement with slide member 16 by means of the upper end of operating arm 12 which contacts the back face of slide member 16 at the same time as the hook-shaped member engages the lower flange of same.

A worm gear 17, which is pinned or otherwise suitably fastened on shaft 18, is adapted to mesh with the teeth 14 on the lower end of operating arm 12. The upper end of shaft 18 may be held in place with the worm gear and arcuate teeth 14 in operative mesh by means of a suitable holding member 19 which extends crosswise of channel 9 and is conventionally anchored thereto. The point of passage of shaft 18 through a suitable small opening in the bottom face of channel 9 provides the second point of support of shaft 18 so that worm gear 17 and arcuate teeth 14 on the end of operating arm 12 are held in suitable meshing position. An operating handle 20 may be fastened to the lower end of shaft 18 in conventional manner for the rotation of same.

If desired, the metal channel may be eliminated, and the worm gear, as well as operating arm pintle 13, mounted on a short frame member 21 (Figure 4), which may be in the form of an open top channel section, or equivalent element. This assembly in turn may be mounted between a pair of wooden strips 22 and 23, which extend completely across frame 2 of the assembly and are anchored at the ends thereof to the frame by nailing, screwing, the use of angle brackets 24 and 25, or other conventional means. This type of construction is particularly desirable where the obtaining of metal for channel 9 is difficult.

Where the ventilator is to be installed in roof panel 26, an opening of the required size will be cut in the roof and a suitable roof opening frame 27 installed therein in conventional manner. The roof ventilator assembly, as typically shown in Figure 1, is then placed in the frame opening and anchored in place by means of screws 28 (Figure 2), or the equivalent. A sealing material, such as oakum, rubber, asphalt, paint, white lead, or the like, would normally be placed between flange 3 and the top of roof panel 26 so that when screws 28 are tightened down, a watertight seal will be made. Flange 3 of the assembly, when installed on a roof as shown, acts as a barrier or backstop for water flowing along the top surface of roof panel 26, and hence makes this type of construction exceptionally watertight. Handle 20, which is preferably removably mounted in conventional manner on shaft 18, may be removed if a screen is to be installed, and subsequently replaced after screen 29 mounted on frame 30 is anchored in place by means of screws 31, or the like, to the lower face of frame 2. Under these conditions, cover member 5 may be moved up and down at will merely by rotating shaft 18 and worm gear 17 by means of handle 20. This type of construction is highly efficient and satisfactory for the purpose at hand, and moreover the anchoring of screen frame 30 to frame 2, by means of screws 31, may be availed of to still further tighten the assembly in place in manner minimizing the possibility of leakage under flange 3.

Another form of the present invention is illustrated in Figures 5 and 6, wherein frame 2a is made of metal, preferably sheet metal, and provided with a side flange 3a as well as a top flange 33. While flange 3a may be tightened down directly onto roof panel 26, it is normally preferable to use packing 34 under flange 3a so that when screws 28 are tightened down, a tightly sealed joint will result. This packing may be of various forms, such as oakum, felt, cork, rubber, cloth, or the like. Where a non-water-proof packing is used for this purpose, it is preferable to pre-treat it with a water-proofing material such as tar, asphalt, rubber cement, or the like.

Before installing the ventilator, an open-ended thimble 35, preferably made from sheet metal, and which may be provided with lower outturned flange 36, is slipped into place with the flange against the under face of roof panel 26, and then screws 37 are driven through suitable openings in the sides of thimble 35 into roof opening frame 27 to hold the thimble in place. This procedure produces a neat and ornamentally trimmed opening so far as observation from below is concerned. The ventilator frame and cover member assembly is then lowered into the opening in roof frame 27, with or without packing under flange 3a thereof. Screws 28 are then inserted through suitable openings in flange 3a and driven in conventional manner into the frame 27 so as to hold the roof ventilator assembly in rigid position. This type of construction permits frame 2a of the ventilator to telescope inside of open-ended thimble 35 while leaving channel 9 rigidly joined on frame 2a at least at two sides thereof, as has been previously described.

Frame 2a is preferably provided with a plurality of extending hook-shaped clips 38 along the lower edge of one side thereof, and at least one movable latching clip 39 which is preferably located on the lower edge of the opposite side of said frame. A suitable screen 29a with frame 40 may be used in conjunction with said clips for closing the lower end of ventilator frame 2a. Operating handle 20 with this type of construction would preferably be mounted on shaft 18 in such manner that same would be below screen 29a but ordinarily above the lower face of flange 36 on the end of thimble 35. The mounting of the handle entirely above the lower face of flange 36, or ceiling elevation, whichever is the lowest, presents the advantage of avoiding the dangers incident to the use of handles projecting into a trailer at elevations below ceiling level, although the latter is standard practice so far as present day house trailer roof ventilators are concerned. The present improved method of mounting the operating assembly provides a simple solution to the previous breakage difficulties, while the telescoping of the trimming thimble over the frame portion of the assembly provides a combination which is entirely independent of moderate variations of house trailer roof thickness.

Other modes of applying the principle of my invention may be employed instead of those explained, change being made as regards the mechanism and combinations herein disclosed, provided the means stated by any of the following claims or the equivalent of such stated means be employed.

I therefore particularly point out and distinctly claim as my invention:

1. A ventilating device, comprising a frame, a cover member for said frame, hinge means for joining one edge of said cover member to said frame, a slide member on the under face of said cover member, said slide member being substantially perpendicular to the hinge edge of said cover member, a supporting means joined to said frame on the inner face of the hinge side thereof, the other end of said supporting means also being fastened to said frame, an operating arm pivotally joined in fixed location on said supporting means at a point substantially spaced from the hinge side of the assembly, means pivotally mounted on one end of said operating arm for engaging, interlocking with, and sliding on said slide member, and means for engaging the other end of said operating arm and adapted to pivotally move same in either direction when at a point between the limits of its travel, said cover being adapted to be held in various positions by said arm when the latter is correspondingly moved about its pivot by said engaging means.

2. A ventilating device, comprising a frame, a cover member for said frame, hinge means for joining one edge of said cover member to said frame, a slide member on the under face of said cover member, said slide member being substantially perpendicular to the hinge edge of said cover member, a supporting means joined to said frame on the inner face of the side thereof on which said hinge means is mounted, said supporting means extending to and joining the side of said frame which is opposite to that carrying said hinge means, an operating arm pivotally joined in fixed location to said supporting means between the ends thereof for movement in a plane substantially perpendicular to the hinge axis of said cover member, a pivoted means on one end of said operating arm for engaging, interlocking with, and sliding on said slide member, and means for engaging the other end of said operating arm and adapted to pivotally swing same in either direction when at a point between the limits of its travel, said cover being adapted to be held in various positions by said arm when the latter is correspondingly moved about its pivot by said engaging means.

3. An operating mechanism for a ventilator cover adapted to fit and cover a frame for an opening through a panel wherein said cover is pivotally connected to said frame at one edge thereof, said mechanism comprising an open top channel member anchored at one end to the inner face of said frame at the side thereof which carries said pivotal connection to said cover member, and at the other end to the inner face of the opposite side of said frame, an operating arm, means for pivotally mounting said operating arm on said channel member a substantial distance from both ends of the latter and in position to move between the side members of said channel in a plane substantially perpendicular to said ventilator cover, the end of said operating arm adjacent the pivot thereof having an arcuate toothed edge, a worm gear in operative mesh with said toothed edge, means for mounting said worm gear in said open top channel, and means for rotating said worm gear, whereby said operating arm may be moved on the pivot thereof.

4. A house trailer roof ventilator, which consists of a frame, an outwardly projecting flange extending completely around the outer face of said frame, a cover member, hinge means for joining one edge of said cover member to said flange, a slide member on the under face of said cover member, said slide member lying in a plane substantially parallel to the plane of movement of said cover member on said hinge means, an operating arm, means for connecting one end of said operating arm to said slide member for movement thereon during opening and closing of said roof ventilator, a pivot for said operating arm, said operating arm being mounted on said pivot near but spaced from the end thereof remote from that connected to said slide member, a supporting means extending across said frame from the hinge means carrying side thereof to the opposite side, means for fastening said supporting means at both ends to said frame, said supporting means having spaced apart side members, said pivot carrying said operating arm between the side members of said supporting means, an arcuate toothed edge on the pivot mounted end of said operating arm, worm gear in operative mesh with said toothed edge, and means for holding said worm gear in place and rotating same for opening and closing said ventilator.

5. A house trailer roof ventilator, which consists of a wooden frame, a gasket on the upper edge of said frame, an outwardly projecting moderate thickness wooden flange extending completely around the outer face of said frame and anchored in a suitable groove in same, a sheet metal cover member, hinge means for joining one edge of said cover member to the outer edge of said flange, a substantially U-shaped slide member on the under face of said cover member, said slide member lying in a plane substantially parallel to the plane of movement of said cover member on said hinge means, insulating means on the under face of said cover member, an operating arm, pivotally mounted hook-shaped means for connecting one end of said operating arm to said slide member for movement thereon during opening and closing of said roof ventilator, a pintle for said operating arm, said operating arm being mounted on said pintle near but spaced from the end thereof remote from that connected to said slide member, a channel shaped supporting means extending across said frame from the hinge means carrying side thereof to the opposite side, means for fastening said supporting means at both ends to said frame, said supporting means having spaced apart side members with the open edge facing said cover member, said pintle extending through the side members of said supporting means and carrying said operating arm between the side members of said supporting means, an arcuate toothed edge on the pintle mounted end of said opening arm, the center line of said arcuate toothed edge coinciding with the center line of said pintle, a worm gear in operative mesh with said toothed edge and adapted upon rotation to move said cover member in the range between closed and open positions, and crank including means for holding said worm gear in place on said supporting member and rotating same for opening and closing said ventilator.

6. A ventilating device adapted for use in a suitable size opening through a panel, which comprises a thimble member adapted to fit into said opening from one side thereof, a frame member with outwardly projecting flange, said flange being adapted to be joined to said panel when said frame member is inserted in said opening in opposite direction to said thimble, said frame telescoping inside of said thimble, a cover member, means for pivotally joining said cover member to said projecting flange, a slide member on the under face of said cover member, said slide member being mounted substantially perpendicular to the pivoted edge of said cover, a supporting means joined to said frame on the inner face of one side thereof, the other end of said supporting means also being fastened to said frame, an operating arm pivotally joined to said supporting means, means on one end of said operating arm for engaging and sliding on said slide member, and means for engaging the other end of said operating arm, said last named means being adapted to pivotally move said arm in either direction about its pivot when at a point between the limits of its travel.

7. A ventilating device adapted for use in a suitable size opening through a panel, which comprises a metal thimble member adapted to fit into said opening from one side thereof, a metal frame member with outwardly projecting flange, said flange being adapted to be joined to said panel when said frame member is inserted in said opening in opposite direction to said thimble, said frame telescoping inside of said thimble, a cover member, means for pivotally joining said cover member to said projecting flange, a slide member on the under face of said cover member, said slide member being mounted substantially perpendicular to the pivoted edge of said cover, a second flange on said frame and extending completely around same, a gasket in position to be clamped between said second flange and said cover member throughout the length of the former, a supporting means joined to said frame on the inner face of the side thereof on which said hinge means is mounted, the other end of said supporting means also being fastened to said frame, an operating arm pivotally joined to said supporting means, means on one end of said operating arm for engaging and sliding on said slide member, and means for engaging the other end of said operating arm, said last named means being adapted to pivotally move said arm in either direction about its pivot when at a point between the limits of its travel.

WALTER J. WOODHAMS.